US006301378B1

United States Patent
Karssemeijer et al.

(10) Patent No.: US 6,301,378 B1
(45) Date of Patent: Oct. 9, 2001

(54) METHOD AND APPARATUS FOR AUTOMATED DETECTION OF MASSES IN DIGITAL MAMMOGRAMS

(75) Inventors: Nico Karssemeijer, Beek; Guido M. te Brake, Utrecht, both of (NL)

(73) Assignee: R2 Technology, Inc., Los Altos, CA (US)

( * ) Notice: Subject to any disclaimer, the term of this patent is extended or adjusted under 35 U.S.C. 154(b) by 0 days.

(21) Appl. No.: 08/868,277

(22) Filed: Jun. 3, 1997

(51) Int. Cl.[7] .................................................. G06K 9/00
(52) U.S. Cl. ........................................... 382/132; 378/37
(58) Field of Search ................................... 382/128–132, 382/155, 156, 194, 195, 308, 159, 160, 181, 193, 190–191, 205, 224, 228; 358/458; 378/98.11, 37; 600/408

(56) References Cited

U.S. PATENT DOCUMENTS

| | | | |
|---|---|---|---|
| 4,851,984 | * 7/1989 | Doi et al. ................................ | 382/108 |
| 5,003,979 | * 4/1991 | Merickel et al. ....................... | 600/410 |
| 5,079,698 | * 1/1992 | Grenier et al. ......................... | 382/128 |
| 5,133,020 | * 7/1992 | Giger et al. ............................ | 382/128 |
| 5,172,419 | * 12/1992 | Manian ................................... | 382/132 |
| 5,212,637 | * 5/1993 | Saxena ................................... | 600/408 |
| 5,224,036 | * 6/1993 | Ito et al. ................................. | 382/13 |
| 5,799,100 | * 8/1998 | Clarke et al. .......................... | 382/132 |
| 5,815,591 | * 9/1998 | Roehrig et al. ........................ | 382/130 |

OTHER PUBLICATIONS

Digital Mammography, Proceedings of 3rd International Workshop on Digital Mammography, Jun. 9–12, 1996, pp. 341–350.*

Baker et al., 1996, "Artificial Neural Network: Improving the Quality of Breast Biopsy Recommendations," *Radiology* 198:131–135.

Bick et al., 1995, "A new Single–Image Method for Computer–Aided Detection of Small Mammographic Masses," In: *Computer Assisted Radiology: Proceedings of the International Symposium on Computer and Communication Systems for Image Guided Diagnosis and Therapy*, Lemke et al., eds. CAR '95 Berlin, Jun. 21–24, 1995.

Brzakovic et al., 1993, "An approach to automated screening of mammograms," *SPIE* 1905:690–701.

Crooks and Fallone, 1993, "A novel algorithm for the edge detection and edge enhancement of medical images," *Med. Phys.* 20(4):993–998.

Doi et al., 1995, "Potential Usefulness of Digital Imaging in Clinical Diagnostic Radiology: Computer–Aided Diagnosis," *Journal of Digital Imaging* 8(1):2–7.

Feig and Yaffe, 1995, "Digital Mammography, Computer–Aided Diagnosis, and Telemammography," *The Radiologic Clinincs of North America: Breast Imaging* 33(6):1205–1230.

(List continued on next page.)

*Primary Examiner*—Jayanti K. Patel
(74) *Attorney, Agent, or Firm*—Pennie & Edmonds LLP

(57) ABSTRACT

A method and apparatus for the automated detection of masses in a digital mammogram, the method for use in a computer aided diagnosis system for assisting a radiologist in identifying and recognizing suspicious portions of the digital mammogram. A gradient image is created from the digital mammogram, and information in the gradient image is processed for identifying masses. In a preferred embodiment, a portion of a spiculation detection algorithm is applied to the gradient image for identifying masses. The spiculation detection algorithm comprises a line detection portion and a post-line detection portion, and it is the post-line detection portion which is applied to the gradient image for identifying masses. Advantageously, computer programs which have already been written for spiculation detection may, with minor modifications, be ported into mass detection programs.

18 Claims, 11 Drawing Sheets

OTHER PUBLICATIONS

Floyd et al., 1994, "Prediction of Breast Cancer Malignancy Using an Artificial Neural Network," *Cancer* 74(11):2944–2948.

Giger et al., 1993, "An 'Intelligent' Workstation for Computer–aided Diagnosis," *Radiographics* 13(3):647–656.

Groshong and Kegelmeyer, 1996, "Evaluation of a Hough Transform Method for Circumscribed Lesion Detection," In: *Digital Mammography '96*, Doi et al., eds. Elsevier Science B. V. pp. 361–366.

Gurney, 1994, "Neural Networks at the Crossroads: Caution Ahead," *Radiology* 193:27–30.

Huo et al., 1995, "Analysis of spiculation in the computerized classification of mammographic masses," *Med. Phys.* 22(10):1569–1579.

Karssemeijer, 1994, "Recognition of stellate lesions in digital mammograms," In: *Digital Mammography*, Gale et al., eds., pp. 211–219.

Karssemeijer, 1995, "Detection of stellate distortions in mammogram using scale space operators," In: *Information Processing in Medical Imaging*, Bizais et al., eds. Kluwer Academic Publishers, Netherlands, pp. 335–346.

Katsuragawa, 1990, "Image feature analysis and computer–aided diagnosis in digital radiography: Effect of digital parameters on the accuracy of computerized analysis of interstitial disease in digital chest radiographs," *Med. Phys.* 17(1):72–78.

Kegelmeyer et al., 1993, "Evaluation of stellate lesion detection in a standard mammogram data set," *SPIE* 1905:787–798.

Kegelmeyer et al., 1994, "Computer–aided Mammographic Screening for Spiculated Lesions," *Radiology* 191:331–337.

Koenderink and Van Doorn, 1992, "Generic Neighborhood Operators," *IEEE Transactions on Pattern Analysis and Machine Intelligence* 14(6).

Lin et al., "Applications of Neural Networks for Improvement of Lung Nodule Detection in Digital Chest Radiographs," pp. IV–20$^{13}$IV–23.

Nishikawa et al., "Computer–aided Detection and Diagnosis of Masses and Clustered Microcalcifications from Digital Mammograms," In: *State of the Art in Digital Mammographic Image Analysis*, Bowyer and Astley, eds. World Scientific Publishing Co., 1993.

Sahiner et al., 1996, "Classification of masses on mammograms using rubber–band straightening transform and feature analysis," *SPIE* 2710:44–50.

Schmidt et al., "Computer–aided Diagnosis in Mammography," *RSNA Categorical Course in Breast Imaging 1995*; pp. 199–208.

Specht, 1990, "Probabilistic Neural Networks," *Neural Networks* 3:109–118.

Specht, "Enhancements to Probabilistic Neural Networks," Proceedings of the IEEE International Joint Conference on Neural Networks, Baltimore, MD. Jun. 7–11, 1992.

Specht and Romsdahl, "Experience with Adaptive Probabilistic Neural networks and Adaptive General Regression Neural Networks," IEEE International Conference on Neural Networks, Orlando, Florida. Jun. 28 to Jul. 2, 1994.

Tahoces et al., 1995, "Computer–assisted diagnosis: the classification of mammographic breast parenchymal patterns," *Phys. Med. Biol.* 40:103–117.

te Brake and Karssemeijer, 1996, "Detection of Stellate Breast Abnormalities," In: *Digital Mammography '96*, Doi et al., eds. Elsevier Science B. V. pp. 341–346.

Thurfjell et al., 1998, "Sensitivity and Specificity of Computer–Assisted Breast Cancer Detection in Mammography Screening," *Acta Radiologica* 39:384–388.

Vyborny and Giger, 1994, "Computer Vision and Artificial Intelligence in Mammography," *AJR* 162:699–708.

Wei et al., 1995, "Classification of mass and normal breast tissue on digital mammograms: Multiresolution texture analysis," *Med. Phys.* 22(9):1501–1513.

Wu et al., 1993, "Artificial Neural Networks in Mammography: Application to Decision Making in the Diagnosis of Breast Cancer," *Radiology* 187:81–87.

Yin et al., 1991, "Computerized detection of masses in digital mammograms: Analysis of bilateral subtraction images," *Med. Phys.* 18(5):955–963.

Yoshimura et al., 1992, "Computerized Scheme for the Detection of Pulmonary Nodules: A Nonlinear Filtering Technique," *Invest. Radiol.* 27:124–129.

Zhang and Giger, 1995, "Automated detectionof spiculated lesions and architectural distortions of digitized mammograms," *SPIE* 2434:846–854.

Zheng et al., 1995, "Computerized Detection of Masses in Digitized Mammograms Using Single–Image Segmentation and a Multilayer Topographic Feature Analysis," *Acad. Radiol.* 2:959–966.

* cited by examiner

METHOD AND APPARATUS FOR AUTOMATED DETECTION OF MASSES IN DIGITAL MAMMOGRAMS

CROSS-REFERENCE TO RELATED APPLICATIONS

The subject matter of this application is related to the subject matter of U.S. patent application Ser. No. 08/676,660, entitled "Method and Apparatus for Fast Detection of Spiculated Lesions in Digital Mammograms," filed on Jul. 10, 1996 and assigned to the assignee of the present invention. The above application is hereby incorporated by reference into the present application.

FIELD OF THE INVENTION

The present invention relates to the field of computer aided diagnosis of abnormal lesions in medical images. In particular, the invention relates to a fast algorithm for detecting masses in a digital mammogram to assist in the detection of malignant breast cancer tumors at an early stage in their development.

BACKGROUND OF THE INVENTION

Breast cancer in women is a serious health problem, the American Cancer Society currently estimating that over 180,000 U.S. women are diagnosed with breast cancer each year. Breast cancer is the second major cause of cancer death among women, the American Cancer Society also estimating that breast cancer causes the death of over 44,000 U.S. women each year. While at present there is no means for preventing breast cancer, early detection of the disease prolongs life expectancy and decreases the likelihood of the need for a total mastectomy. Mammography using x-rays is currently the most common method of detecting and analyzing breast lesions.

The detection of suspicious portions of mammograms is an important first step in the early diagnosis and treatment of breast cancer. FIG. 1A shows a continuum of potentially cancerous shapes found in mammograms, ranging from sharply defined masses on the left, moving rightward to somewhat spiculated (i.e., stellar-shaped) masses, mostly spiculated masses, highly spiculated masses, and then finally to pure spiculations on the right.

Sharply defined masses such as those at the left of FIG. 1A are rarely associated with malignant tumors, while the presence of spiculated masses is a strong indicator of malignancy. Pure spiculations, however, are often found among normal fibrous breast tissue and may not indicate a cancerous condition at all. Overall, both the mass qualities and "spiculatedness" qualities of shapes found in mammograms must be analyzed in locating suspicious portions of the mammogram.

While it is important to detect the suspicious portions of an x-ray mammogram as early as possible, i.e. when they are as small as possible, practical considerations can make this difficult. In particular, a typical mammogram may contain myriads of lines corresponding to fibrous breast tissue, and the trained, focused eye of a radiologist is needed to detect suspicious features among these lines. Moreover, a typical radiologist may be required to examine hundreds of mammograms per day, leading to the possibility of a missed diagnosis due to human error.

Accordingly, the need has arisen for a computer-assisted diagnosis (CAD) system for assisting in the detection of abnormal lesions in medical images. The desired CAD system digitizes x-ray mammograms to produce a digital mammogram, and performs numerical image processing algorithms on the digital mammogram. The output of the CAD system is a highlighted display which directs the attention of the radiologist to suspicious portions of the x-ray mammogram. The desired characteristics of a CAD system are high speed (requiring less processing time), high sensitivity (the ability to detect subtle suspicious portions), and high specificity (the ability to avoid false positives).

Many algorithms for processing digital mammograms in CAD systems start by processing the digital mammogram to locate masses (or "densities"). After this step, the "spiculatedness" of these masses is characterized. See Yin et. al., "Computerized Detection of Masses in Digital Mammograms: Analysis of Bilateral Subtraction Images," *Med. Phys.* 18(5), September/October 1991, pp. 955–963, and Sahiner et. al., "Classification of Masses on Mammograms Using a Rubber-Band Straightening Transform and Feature Analysis," *Medical Imaging* 1996, SPIE Symposium on Medical Imaging (San Diego, Calif.), Paper No. 2710-06 at p. 204, the contents of which are hereby incorporated by reference into the present application.

A key shortcoming of the above serial approach, in which masses are first detected and then analyzed in a subsequent step, is that some very suspicious shapes are not recognized. In particular, those masses which are small, but which are highly spiculated, often do not survive the "first cut" of the mass detection routine, which will not recognize masses having density characteristics below a certain threshold. This shortcoming was recognized by Nico Karssemeijer in "Recognition of Stellate Lesions in Digital Mammograms," *Digital Mammography: Proceedings of the 2nd International Workshop on Digital Mammography*, York, England, Jul. 10–12 1994 (Elsevier Science 1994), pp. 211–219, the contents of which are hereby incorporated by reference into the present application. There, Karssemeijer proposes an algorithm for the direct detection of spiculations ("stellate patterns") in a digital mammogram without assuming the presence of a central mass.

Another method for the direct detection of spiculations in digital mammograms is provided in Kegelmeyer et. al., "Computer-aided Mammographic Screening for Spiculated Lesions," *Radiology* 191:331–337 (1994), the contents of which are hereby incorporated by reference into the present application. Yet another method for the direct detection of spiculations, along with linear classification steps which use both mass and spiculation information in identifying suspicious portions of the digital mammogram, is provided by Roehrig et. al. in the above referenced U.S. patent application entitled "Method and Apparatus for Fast Detection of Spiculated Lesions in Digital Mammograms."

One improvement which may be incorporated into CAD systems is further integration and symmetry between of the steps of mass detection and spiculation detection. Such integration and symmetry would provide for more efficient programming of the CAD system, more efficient processing by the CAD system, and reduced memory requirements. In particular, it would be desirable to execute both mass detection and spiculation detection steps using the same or similar computation engines in the CAD system. Additionally, it would be desirable to harness algorithmic advances made in spiculation detection algorithms by applying them to mass detection algorithms.

Accordingly, it is an object of the present invention to provide a fast computer-assisted diagnosis (CAD) system for assisting in the identification of suspicious masses and spiculations in digital mammograms, the CAD system being capable of producing an output which directs attention to suspicious portions of the x-ray mammogram for increasing the speed and accuracy of x-ray mammogram analysis.

It is a further object of the present invention to provide a method for adapting a spiculation detection algorithm for use in a mass detection algorithm, for increased symmetry and integration of CAD system algorithms, and for adapting algorithmic advances in spiculation detection algorithms to mass detection algorithms.

SUMMARY OF THE INVENTION

These and other objects of the present invention are provided for by an improved CAD system capable of detecting masses in a digital mammogram image, wherein a gradient image is created from the digital mammogram, and wherein information in the gradient image is then processed for identifying masses. In a preferred embodiment, a portion of a spiculation detection algorithm is applied to the gradient image for identifying masses.

A spiculation detection algorithm normally comprises a line detection portion and a post-line detection portion. However, in a preferred embodiment, the post-line detection portion of the spiculation detection algorithm is applied to a gradient image for identifying masses, instead of being applied to a line image for identifying spiculations. Thus, instead of being provided with line and direction parameters, the post-line detection portion of the spiculation detection algorithm is provided with gradient magnitude and gradient direction parameters. The post-line detection portion of the spiculation detection algorithm then operates normally, except that its output corresponds to mass location and mass Idensity information instead of spiculation location and spiculation intensity information.

Advantageously, computer programs which have already been written for spiculation detection may, with minor modifications, be ported into mass detection programs. Furthermore, advances in the speed and accuracy of spiculation detection algorithms may be applied for use in creating faster and more accurate mass detection algorithms.

When a post-line detection portion of a spiculation detection algorithm has been adapted according to a preferred embodiment, the resulting method of detecting masses operates as follows. A gradient plane is computed from the digital mammogram, each pixel of the gradient plane having gradient magnitude and gradient direction information. A set of edge pixels S in the gradient plane is selected by selecting those pixels having a gradient magnitude greater than a first threshold. A set of candidate pixels in the digital mammogram image is then selected, and, for each candidate pixel "icand", a first density metric $G1_{icand}$ is computed. The metric $G1_{icand}$, termed a density magnitude metric, is computed according to the steps of (a) selecting a neighborhood of pixels $NH_{icand}$ around the candidate pixel, (b) selecting a small region $R_{icand}$ around the candidate pixel, (c) selecting a first set of pixels in the neighborhood $NH_{icand}$ having gradient directions pointing toward the small region $R_{icand}$ and being members of the set S having a gradient magnitude greater than a predetermined lower threshold, and (d) counting the number of pixels in the first set, wherein the first density metric $G1_{icand}$ is proportional to the number of pixels in the first set.

A second density metric $G2_{icand}$, termed a mass isotropy metric, is also computed for each candidate pixel icand, according to the steps of (a) selecting K spatial bins (icand, k) extending radially from the candidate pixel and being arranged in a radially symmetric manner around the candidate pixel, (b) for each pixel (icand,jpoint) of the first set of pixels, identifying the spatial bin (icand,k) in which the pixel (icand,jpoint) is located, (c) computing a number of pixels $n_{icand,k}$ in each spatial bin (icand,k), and (d) analyzing the statistical distribution of the number $n_{icand,k}$ as k is varied, wherein the mass isotropy metric $G2_{icand}$ is proportional to the number of values k for which $n_{i,k}$ is greater than a median value for random gradient orientations. Finally, the density magnitude and mass isotropy metrics G1 and G2 are evaluated according to a linear classifier or neural network method for determining the locations and intensities of suspicious masses in the digital mammogram.

DETAILED DESCRIPTION OF THE INVENTION

Figure 1A:
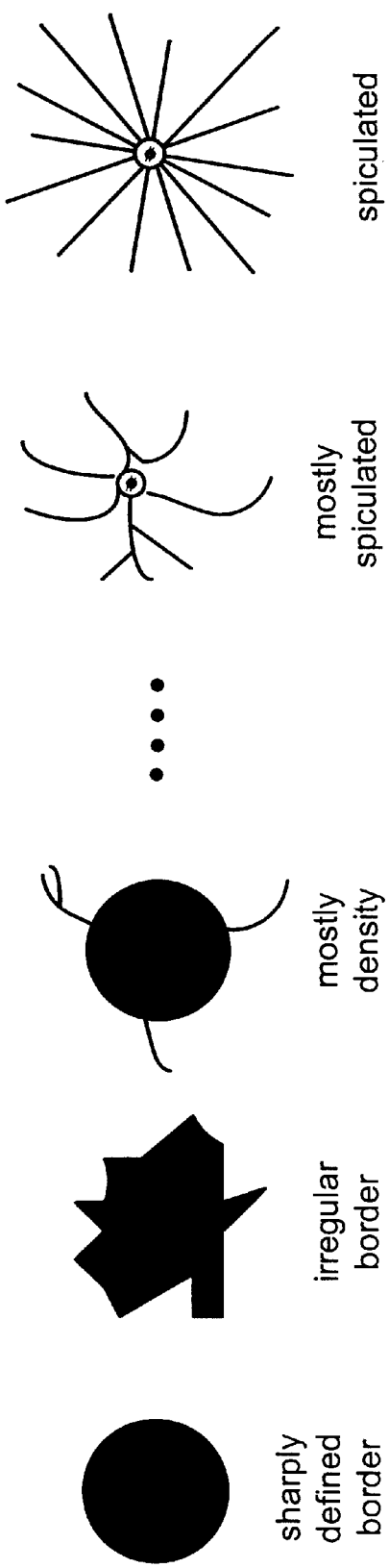
FIG. 1A shows a continuum of potentially cancerous shapes found in digital mammograms, including shapes which may be detected by a computer aided diagnostic (CAD) system in accordance with a preferred embodiment.
Figure 1B:
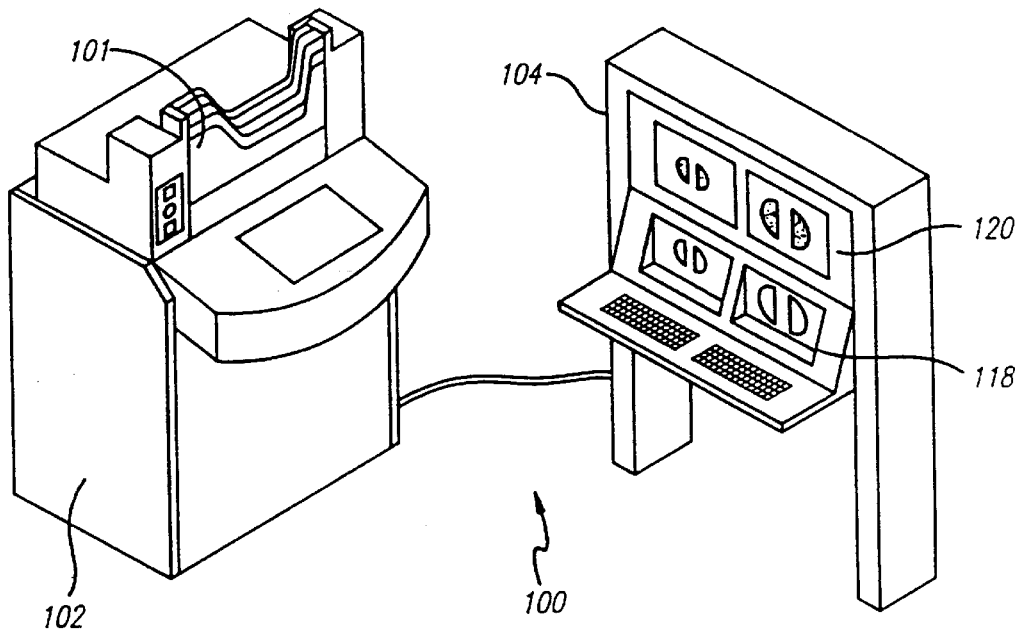
FIG. 1B shows an outside view of a CAD system according to a preferred embodiment.

FIG. 1B shows an outside view of a computer aided diagnostic (CAD) system 100 for assisting in the identification of spiculated lesions in mammograms according to the present invention. CAD system 100 is used as a step in the processing of films for mammography exams. CAD system 100 comprises a CAD processing unit 102 and a viewing station 104. In general, CAD processing unit 102 scans an x-ray mammogram into a digital mammogram image, processes the image, and outputs a highlighted digital mammogram for viewing at viewing station 104.

Figure 1C:
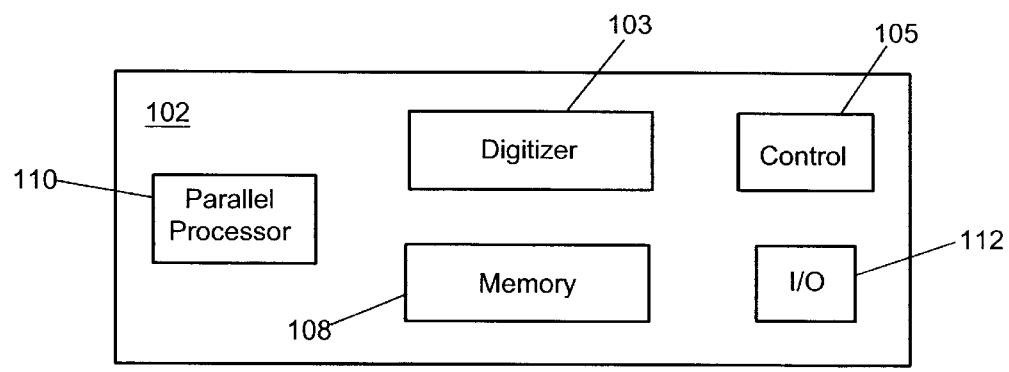
FIG. 1C shows a block diagram of a CAD processing unit of a CAD system according to a preferred embodiment.

FIG. 1C shows a block diagram of CAD processing unit 102. CAD processing unit 102 comprises a digitizer 103, such as a laser scanner with 50 micron resolution, for digitizing a developed x-ray mammogram 101, the x-ray mammogram 101 being shown in FIG. 1B at an input to the CAD processing unit 102. CAD processing unit 102 generally includes elements necessary for performing image processing including parallel processing steps. In particular, CAD processing unit 102 includes elements such as a central control unit 105, a memory 108, a parallel processing unit 110, and I/O unit 112. It is to be appreciated that in addition to the mass and spiculation detection algorithms disclosed herein, processing unit 102 is capable of performing a multiplicity of other image processing algorithms, such as linear classifier algorithms and neural network algorithms, either serially or in parallel with the disclosed mass and spiculation detection algorithms.

Viewing station 104 is for conveniently viewing both the x-ray mammogram 101 and the output of the CAD processing unit 102 on a display device 118. The display device 118 may be, for example, a CRT screen. The display device 118 typically shows a highlighted digital mammogram corresponding to the x-ray mammogram 101, the highlighted digital mammogram having information directing the attention of the radiologist to special areas which may contain spiculations as determined by image processing steps performed by the CAD processing unit 102. In one embodiment of the invention, the highlighted digital mammogram will have black or red circles superimposed around those locations corresponding to spiculated lesions.

Viewing station 104 also comprises a backlighting station 120 for viewing the actual x-ray mammogram 101 itself. The radiologist is assisted by the CAD system 100 by viewing the display device 118, which then directs the attention of the radiologist to the spiculated portions of the actual x-ray mammogram 101 itself. It is to be appreciated that the CAD processing unit 102 is capable of performing other image processing algorithms on the digital mammogram in addition to or in parallel with the algorithms for detecting masses and spiculations in accordance with the present invention. In this manner, the radiologist may be informed of several suspicious areas of the mammogram at once by viewing the display device 118, spiculations being one special type of the suspicious area.

After x-ray mammogram 101 has been developed, it is inserted into the CAD system 100, which will ideally be located near the x-ray development area of a mammography clinic. After being digitized by digitizer 103, the x-ray mammogram will be transported using means not shown to the viewing station 104 for viewing by the radiologist along with the output of the display device 118 as described above. After the x-ray mammogram 101 has passed through the CAD system 100, it will be taken away and will undergo the same processing currently practiced in clinics. It is to be noted that memory 108 of CAD processing unit 102 may be used in conjunction with I/O unit 112 to generate a permanent record of the highlighted digital mammogram described above, and/or may also be used to allow non-real-time viewing of the highlighted digital mammogram.

Figure 2:
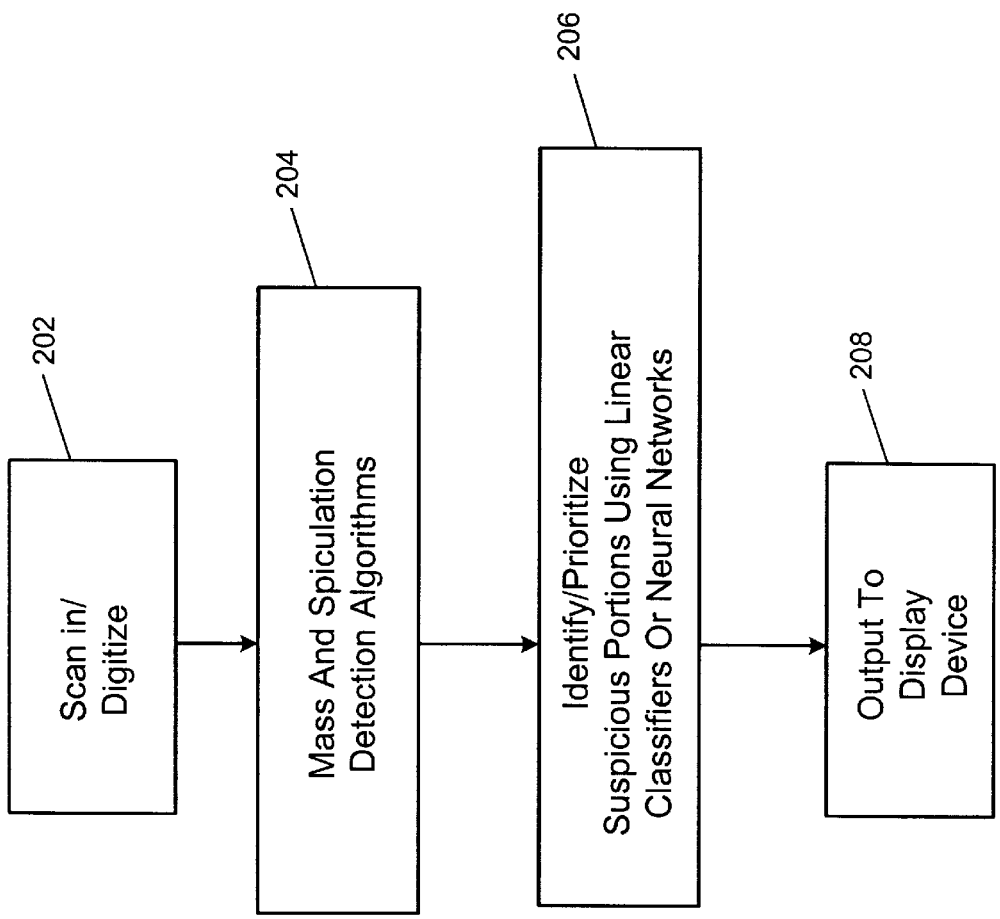
FIG. 2 is a flowchart representing overall steps taken by the CAD system of FIG. 1B.

FIG. 2 shows the general steps performed by CAD processing unit 102 on the x-ray mammogram. At step 202, the x-ray mammogram is scanned in and digitized into a digital mammogram. The digital mammogram may be, for example, a 3000×4000 array of 12-bit gray scale pixel values. Such a digital mammogram would generally correspond to a typical 8"×10" x-ray mammogram which has been digitized at a 50 micron spatial resolution. Because a full resolution image such as the 3000×4000 image described above is not necessary for the effectiveness of the preferred embodiment, the image may be locally averaged, using steps known in the art, down to a smaller size corresponding, for example, to a 200 micron spatial resolution. At such a resolution, a typical image would then be an M×N array of 12-bit gray scale pixel values, with M being near 900, for example, and N being near 1200, for example. In general, however, either the full resolution image or the locally averaged image may be used as the original digital mammogram in accordance with the preferred embodiment. Without limiting the scope of the present disclosure, and for clarity of disclosure, the "digital mammogram image" is considered to be an exemplary M×N array of 12-bit gray scale pixel values.

FIG. 2 shows the digital mammogram image being processed at step 204 by mass detection algorithms and spiculation detection algorithms. A typical mass detection algorithm receives a digital mammogram image and produces an output plane comprising, for each pixel location (i,j), a measure corresponding to mass characteristics of the digital mammogram image at (i,j). Examples of such algorithms are disclosed, for example, in Yin et al., supra, and in U.S. Pat. No. 5,133,020 to Giger et al, entitled "Automated Method and System for the Detection and Classification of Abnormal Lesions and Parenchymal Distortions in Digital Medical Images," the latter disclosure being hereby incorporated by reference into the present application. Mass characteristics may include mass area, mass elongation, mass contrast, and other measures which reflect mass events. Mass characteristics may also include information derived from region-growing algorithms known in the art and described, for example, in Gonzalez, *Digital Image Processing* at pp. 369–375, the disclosure of which is incorporated herein by reference into the present application.

A typical spiculation detection algorithm receives a digital mammogram image and produces an output plane comprising, for each pixel location (i,j), a measure corresponding to spiculation characteristics of the digital mammogram image at (x,y). Examples of spiculation characteristics are provided in U.S. patent application Ser. No. 08/676,660, supra, and may include, for example, a cumulative array $C(i,j)$ which is related to the presence of spiculations centered at (i,j), and an eccentricity plane $ECC(i,j)$ which is inversely related to circularity of spiculations centered at (i,j).

FIG. 2 further shows a step 206, which uses the mass characteristics and spiculation characteristics generated at step 204 for identifying and prioritizing suspicious portions of the digital mammogram by using linear classifiers or neural networks. In general, each location (i,j) is evaluated separately by consideration of the various mass and spiculation characteristics at that pixel location.

At step 206, a method of linear classifiers using rule-based cuts (thresholds) on each feature or combinations of features may be used to determine suspicious regions. By way of non-limiting example, the value of the cumulative array $C(i,j)$ may simply be thresholded by a threshold value. As another example, a plot may be made of $(1/ECC(i,j))$ versus mass elongation for pixels (i,j) having a mass area value above a certain mass area threshold. Minimum threshold values along the abscissa and ordinate may be selected, and events falling in the upper right quadrant may be selected as suspicious regions, with a view toward not identifying large elongated masses unless they are associated with a highly circular spiculation. The values of thresholds used may be determined empirically by examining the distribution of true and false positive indications.

As a further nonlimiting example, at step 206 a simple linear classifier may be constructed to indicate a suspicious location for any (i,j) for which all the following events occur: (a) the cumulative array C(i,j) is greater than a first cumulative array threshold, indicating a large spiculation; (b) the mass area around the pixel (i,j) is greater than a first mass area threshold indicating a large mass; and (c) the eccentricity value ECC(i,j) is below a first spiculation eccentricity threshold, indicating the presence of circular spiculated shape. Following step 206, the digital mammogram image and list of suspicious locations and information is sent for display to the viewing station 104 at step 208.

Figure 3:
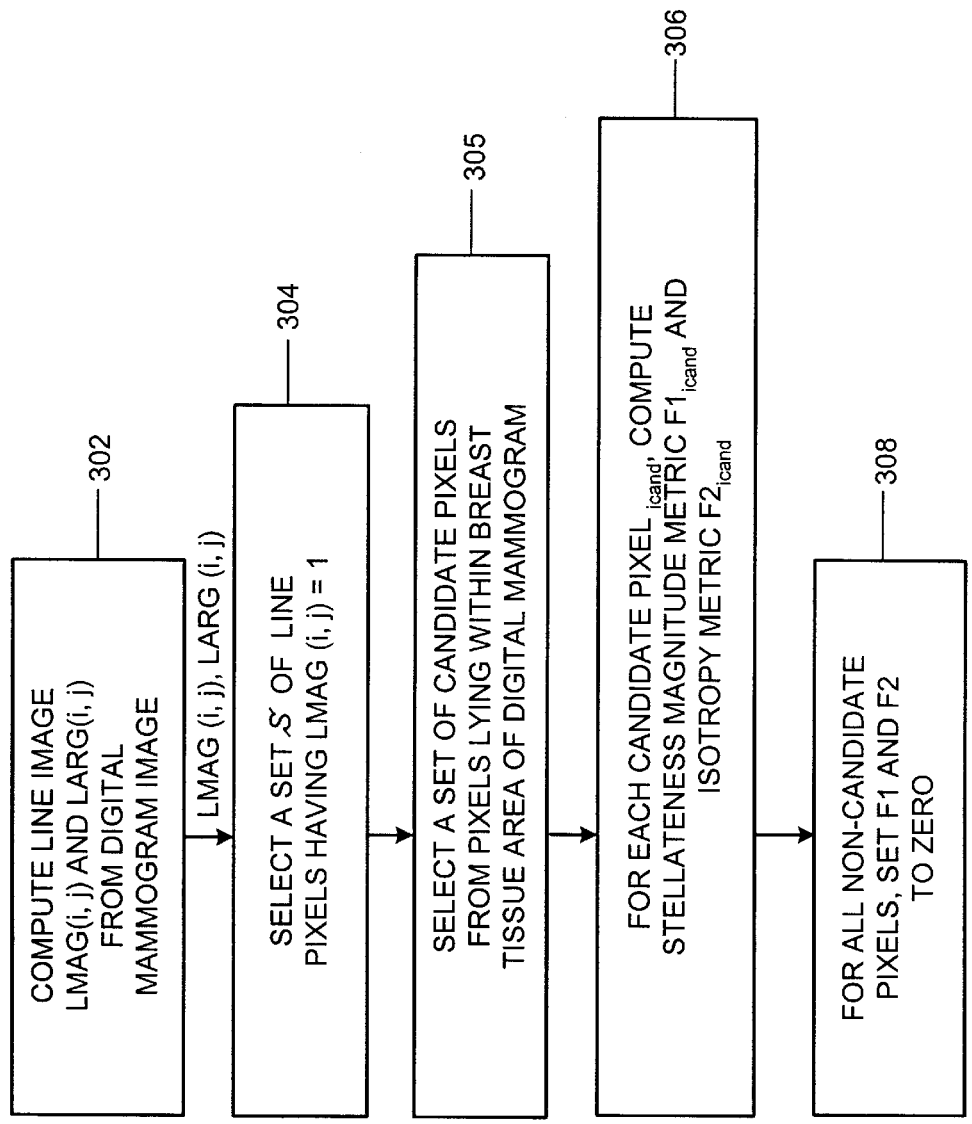
FIG. 3 is a flowchart representing overall steps normally taken in a spiculation detection algorithm.

FIG. 3 shows in more detail the steps associated with a spiculation detection algorithm for use at step 204. The spiculation detection algorithm at FIG. 3 is similar to that described in Karssemeijer, "Recognition of Stellate Lesions in Digital Mammograms," supra. At step 302, a line image is computed from the digital mammogram image, each line image pixel having a line magnitude LMAG(i,j) and line direction LARG(i,j). Generally, LMAG(i,j) is 1 if the pixel (i,j) is associated with a line, and LMAG is 0 otherwise.

Figure 4:
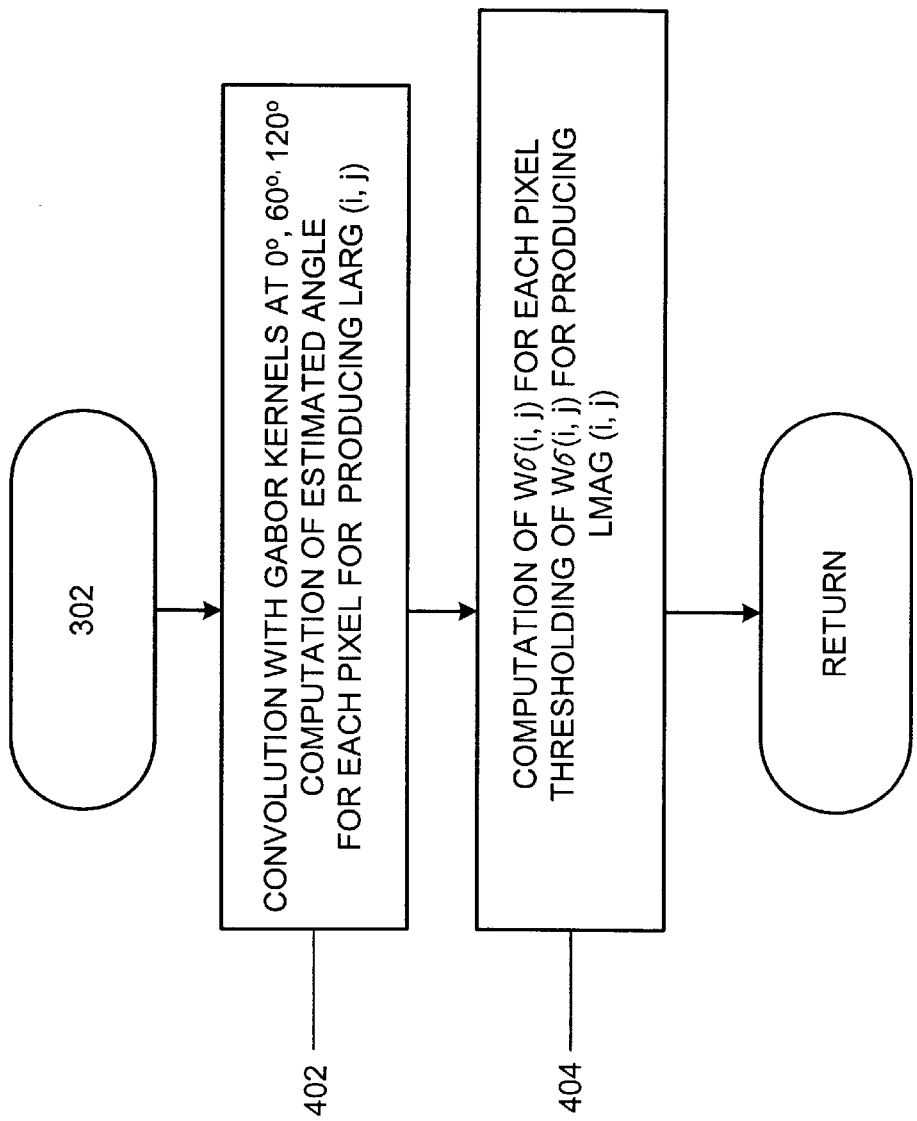
FIG. 4 is a flowchart showing a line detection step of a spiculation detection algorithm.

FIG. 4 shows steps corresponding to the line image generation step 302 of FIG. 3. Shown at FIG. 4 is the direction detection step 402 for detecting at each pixel (i,j) a direction corresponding to a line, if any, passing through the pixel (i,j) in the digital mammogram image. Direction detection step 402 comprises the step of separately convolving the digital mammogram image with three Gabor kernels $K_0$, $K_{60}$, and $K_{120}$. The Gabor kernels are derived from the Gabor filter which, as known in the art, is the second derivative of a Gaussian kernel given by:

$$G(r, \sigma) = \frac{1}{2\pi\sigma^2} \exp((-r^2)/(2\sigma^2)) \quad (1)$$

The second derivative of this function with respect to x, quantized into a finite sized integer array, yields the $K_0$ kernel. It is to be appreciated that the $K_0$ kernel is a two dimensional convolution kernel which is generally small (e.g., 11×11 pixels) in comparison to the digital mammogram image (e.g., 900×1200 pixels). By rotating the $K_0$ array by 60 degrees and 120 degrees, two other kernels $K_{60}$ and $K_{120}$ are obtained. The step of separately convolving the digital mammogram with the kernels $K_0$ $K_{60}$, and $K_{120}$ yields three images $W_0$ (i,j), $W_{60}$ (i,j), and $W_{120}$ (i,j), respectively.

At step 402, direction information LARG(i,j) for each pixel (i,j) is obtained by using a formula which can be derived from relations disclosed in Koenderink and Van Doorn, "Generic Neighborhood Operators," *IEEE Transactions on Pattern Analysis and Machine Intelligence*, Vol. 14, No. 6 (June 1992) and given by:

$$LARG(i, j) = \frac{1}{2} a \tan\sqrt{3} \left( \frac{W_{60}(i, j) - W_{120}(i, j)}{W_{60}(i, j) + W_{120}(i, j) - 2W_0(i, j)} \right) \quad (2)$$

FIG. 4 further shows line detection step 404 for detecting line information in the digital mammogram image. Positive contrast (light) lines are important, as opposed to negative contrast (dark) lines, since the former is how spiculations are manifested in x-ray films. Line detection step 404 comprises the step of deriving a function $W_o(i,j)$ from the images $W_0(i,j)$, $W_{60}(i,j)$, and $W_{120}(i,j)$ using a formula disclosed in the Koenderink reference cited supra:

$$W_\sigma(i, j) = \frac{1}{3}(1 + 2\cos(2LARG(i, j))W_0(i, j) + \\ \frac{1}{3}(1 - \cos(2LARG(i, j))W_{60}(i, j) + \\ \frac{1}{3}(1 - \cos(2LARG(i, j)) - \sqrt{3} \sin(2LARG(i, j))W_{120}(i, j) \quad (3)$$

After being computed, $W_o(i,j)$ is thresholded at a constant positive threshold value for obtaining a binary line image: for each pixel (i,j), if $W_o(i,j)$ is greater than that threshold value, LMAG(i,j) is set to 1; otherwise, LMAG(i,j) is set to 0.

Thus, after step 404, there exists a line image comprising line magnitude information LMAG(i,j) and line direction information LARG(i,j) corresponding to the digital mammogram image for further processing by subsequent spiculation detection steps. While there are several methods known in the art for line image generation, the above approach is employed because the computationally intensive parts consist of the three convolutions performed to obtain $W_0(i,j)$, $W_{60}(i,j)$, and $W_{120}(i,j)$, and these convolutions are easily implemented in a highly parallel processor such as that used in processing unit 104. By implementing these convolutions in the spatial domain in a hardware parallel processor, the speed of computation easily meets normal through-put requirements for clinical practice.

Referring again to FIG. 3, at step 304 a set of line pixels S in the digital mammogram image is identified. The set of line pixels S is simply the set of pixels having coordinates (i,j) for which LMAG(i,j) is equal to 1. At step 305 a set of candidate pixels is identified, the candidate pixels being those locations in the digital mammogram which may correspond to the centers of spiculations. While the center of a spiculation may fall within the set S of line pixels identified above, this does not always occur. In particular, a spiculation may be a set of lines which radiate from a common center but which do not actually occupy the center pixel itself. Accordingly, the candidate pixels may be selected from an area encompassing the entire breast tissue area of the digital mammogram.

More particularly, the selection of the candidate pixels may be performed by (1) identifying the breast tissue area of the digital mammogram and then (2) selecting pixels within that area as candidate pixels. The step of identifying the breast tissue area may be performed by a simple thresholding of the entire digital mammogram image at a low threshold value. This operation will have the effect of cancelling out all background (non-breast) regions of the digital mammogram.

The portion of the digital mammogram which survives the thresholding operation, i.e. the breast tissue area, is then sampled to provide the set of candidate pixels. In a preferred embodiment, the breast tissue area is sampled on a regular grid, e.g., a rectangular grid, at a regular sampling intervals such as every $m^{th}$ pixel. While a typical value for the sampling interval m may be 4 for a 900×1200 digital mammogram image, the scope of the present disclosure is not so limited, and the breast tissue may be sampled at greater or lesser intervals as appropriate, including an interval of m=1.

At step 306, two "spiculatedness" or "stellateness" metrics are computed for each candidate pixel. For clarity of disclosure, the candidate pixels will be referenced by a linear index "icand", it being understood that each candidate pixel actually has a coordinate ($i_{icand}, j_{icand}$) in the image. In particular, a stellateness magnitude metric $F1_{icand}$ and an isotropy metric $F2_{icand}$ are computed, as will be described further infra. At step 308, the stellateness magnitude F1 and isotropy metric F2 are set to zero for all non-candidate pixels. All pixels in the line image having then been assigned values for F1 and F2, the stellateness magnitude metric F1(i,j) and isotropy metric F2(i,j) are then provided to the classification step 206 of FIG. 2 for determination of suspicious portions of the digital mammogram, using methods generally known in the art.

Figure 5:
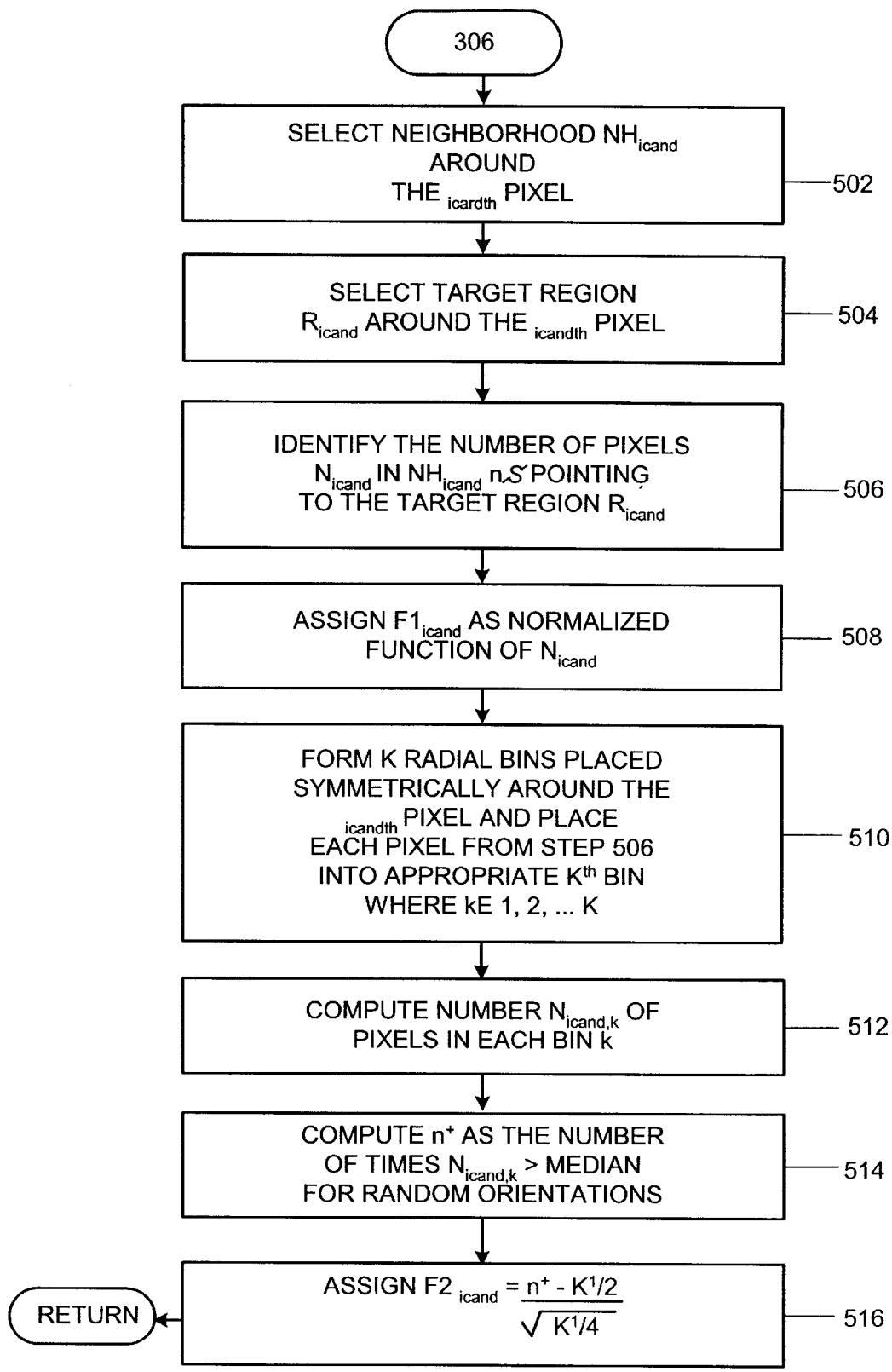
FIG. 5 is a flowchart representing steps taken by the a post-line detection step of a spiculation detection algorithm.

FIG. 5 shows a block diagram outlining step 306 for computing the stellateness magnitude metric $F1_{icand}$ and isotropy metric $F2_{icand}$ for each candidate pixel. At step 502, a neighborhood of pixels $NH_{icand}$ around the $icand^{th}$ candidate pixel is selected. Although the scope of the preferred embodiment is not so limited, the neighborhood $NH_{icand}$ is generally chosen as an annulus around the $icand^{th}$ candidate pixel, the annulus having an inner radius $r_{min}$ and an outer radius $r_{max}$. By way of example and not by way of limitation, typical values for $r_{min}$ and $r_{max}$ may be 4 mm and 16 mm, respectively.

Figure 6:
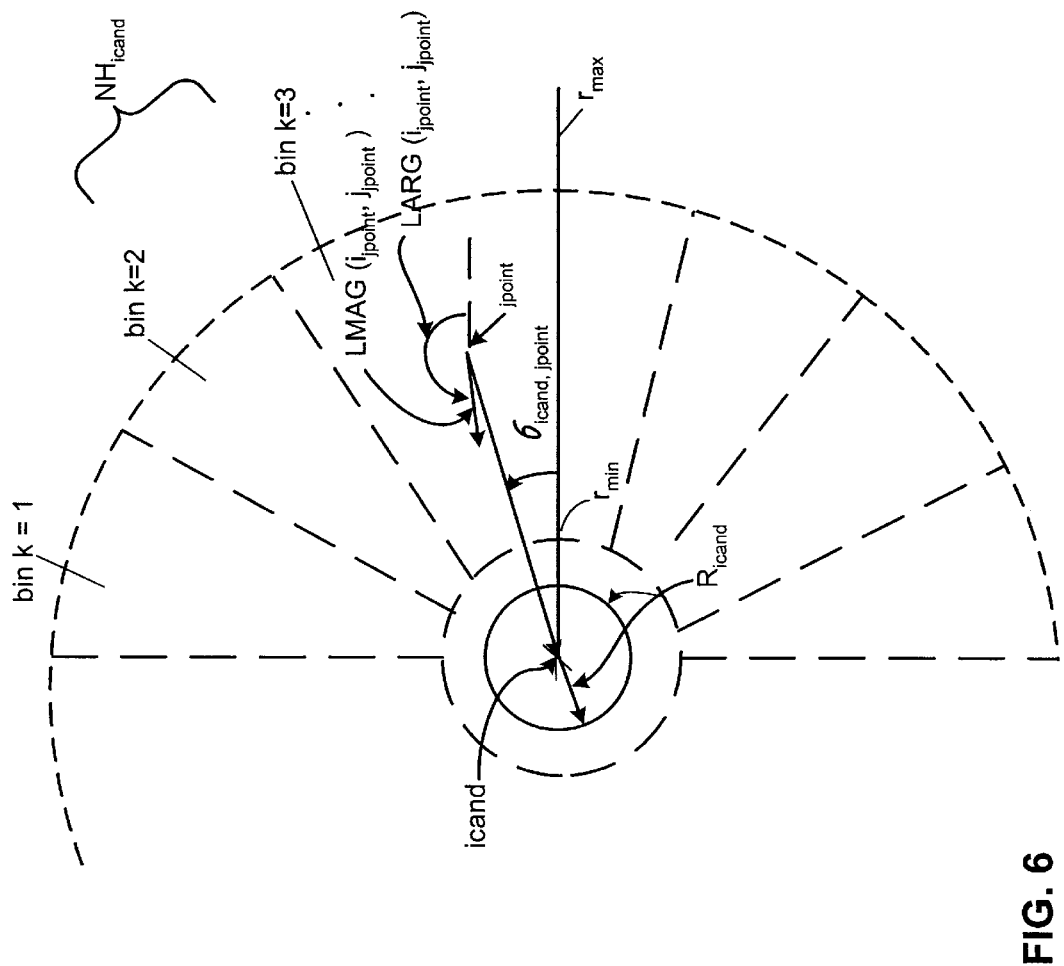
FIG. 6 is a diagram of a neighborhood pixel in relation to a candidate pixel showing parameters used in a post-line detection step of a spiculation detection algorithm.

FIG. 6 shows a conceptual diagram of the $icand^{th}$ candidate pixel and its surrounding neighborhood $NH_{icand}$. At step 504, a small target region $R_{icand}$, having a radius of the same designation, is identified around the candidate pixel. The target region $R_{icand}$ is also shown in FIG. 6. By way of example and not by way of limitation, a typical value for $R_{icand}$ may be 2 mm. At step 506, a subset of pixels lying in the neighborhood $NH_{icand}$ is identified, this subset having the property that (a) each pixel is also in the set S of pixels having LMAG(i,j) equal to 1, and (b) the line directions LARG(i,j) for each pixel points toward the target region $R_{icand}$.

Generally, those candidate pixels having a larger number of surrounding pixels with line directions pointing toward the candidate pixel icand are more likely to be at the center of spiculations. Accordingly, a stellateness magnitude measure would be proportional to the number of pixels surrounding the $icand^{th}$ pixel having such characteristics. Denoting the length of a line between the $icand^{th}$ pixel and the pixel jpoint as $r_{icand,jpoint}$, and denoting the angle formed by this line as $\phi_{icand,jpoint}$, the number $n_{icand}$ is computed in step 506 as expressed in the following equations.

$$n_{icand} = \sum_{jpoint \in NH_{icand} \cap S} h(LARG(i_{jpoint}, j_{jpoint}), \varphi_{icand,jpoint}, l_{icand,jpoint}) \quad (4)$$

$$h = 1 \text{ if } abs(\varphi_{icand,jpoint} - LARG(i_{jpoint}, j_{jpoint})) < \frac{R_{icand}}{r_{icand,jpoint}} \quad (5)$$

$$\text{else } h = 0$$

For purposes of better understanding equation (5) in relation to FIG. 6, it is to be appreciated that the tangent of a small angle is approximately equal to the value of that small angle in radians. Accordingly, the argument of the absolute value symbol in equation (5) is an approximation of the tangent of an angle formed by (a) a vector pointing from icand to jpoint in FIG. 6, and (b) a vector originating from jpoint and pointing in the direction of LARG($i_{jpoint}, j_{jpoint}$). Thus, if LARG($i_{jpoint}, j_{jpoint}$) points directly at the point icand or a nearby point, the value of this angle is zero or nearly zero, respectively.

For more optimal use in subsequent classifier steps, the stellateness magnitude measure $F1_{icand}$ is based on a normalized version of $n_{icand}$. In order to normalize $n_{icand}$, its mean value and variance are estimated under the assumption that the line direction orientation map is a uniformly distributed random noise pattern. A mean probability p that a pixel in this random map points to the target region $R_{icand}$ is shown in the following equation.

$$p = \frac{2}{\pi N_{icand}} \sum_{jpoint \in NH_{icand} \cap S} \left( \frac{R}{r_{icand,jpoint}} \right) \quad (6)$$

In Eq. (6), $N_{icand}$ is the total number of pixels in the neighborhood $NH_{icand}$. The stellateness magnitude metric $F1_{icand}$ is then computed at step 508 according to the following equation.

$$F1_{icand} = \frac{n_{icand} - pN_{icand}}{\sqrt{N_{icand}p(1-p)}} \quad (7)$$

Because of this normalization, the sensitivity of the stellateness magnitude metric $F1_{icand}$ and its range do not change systematically when the neighborhood or target size $R_{icand}$ are changed. This enables changing these parameters adaptively and avoids problems at the breast edge.

If an increase in the number of pixels oriented toward the center is found in only a few directions, that is, if the distribution of these points is less circular around the $icand^{th}$ pixel, it is less likely that the site being evaluated belongs to a suspicious spiculated lesion. On the other hand, if this distribution is more isotropic around the $icand^{th}$ pixel, the level of suspicion should increase. Accordingly, a second measure termed the isotropy metric $F2^{icand}$ is constructed.

To construct $F2^{icand}$, K radial direction bins are formed within the neighborhood $NH_{icand}$, and are placed around the $icand^{th}$ pixel in a radially symmetric fashion, as shown in FIG. 6. By way of example and not by way of limitation, a typical value for the number of bins K is 16. At step 510, each pixel identified at step 506, that is, each pixel in $NH_{icand}$ which are in the set S having LMAG($i_{jpoint}, j_{jpoint}$)=1 and which point toward the region $R_{icand}$, is placed into the appropriate $k^{th}$ direction bin, where k=1,2, . . . , K. At step 512, the number of pixels $n_{icand,k}$ in each bin are computed.

At step 514, a number $n^+$ is computed as follows. In each radial direction bin k, the mean probability of finding $n_{icand,k}$ pixels oriented toward $R_{icand}$ is calculated by applying Eq. (7) to each bin separately. Using binomial statistics, the number $n^+$ is computed as the number of times that $n_{icand,k}$ is larger than the median value calculated for random orientations as k varies from 1 to K.

Finally, at step 516, the isotropy measure $F2_{icand}$ is defined by the following equation.

$$F2_{icand} = \frac{n^+ - K'/2}{\sqrt{K'/4}} \quad (8)$$

In equation (9), K'/2 is the expected value of $n^+$ when no signal is present. To avoid boundary effects, only bins with a minimum number of contributing sites is considered. Therefore, near the breast edge the actual number of bins K that are formed is to be reduced. The standard deviation of random fluctuations in the denominator of Eq. (9) normalizes the expression.

Once the values $F1_{icand}$ and $F2^{icand}$ are computed for each candidate pixel icand, the step 308 may be carried out, at which all values F1 and F2 for non-candidate pixels are set to zero. At this point, there is sufficient information to form two spiculation metric planes F1(i,j) and F2(i,j) for processing in linear classifier/neural network step 206 of FIG. 2. Importantly, at step 206 the stellateness measure F1(i,j) and isotropy measure F2(i,j), which increase as the likelihood of a suspicious spiculation increases, may be used in conjunction with other mass and spiculation metrics in making a final determination of the suspicious locations in the digital mammogram image.

Generally, the spiculation detection algorithm outlined at FIG. 3 can be broken down into two overall steps: a line detection step comprising step 302, and a post-line detection step comprising steps 304, 306, and 308. It has been found that the spiculation detection algorithm at FIG. 3 and other spiculation detection algorithms may be adapted for operation as mass detection algorithms. In particular, whenever the spiculation detection algorithm can be broken down into a line detection step and a post-line detection, it is capable of adaptation into a mass detection algorithm by first computing a gradient image and than applying the post-line detection step of the spiculation detection algorithm to the 15 gradient image instead of the line image.

Figure 7:
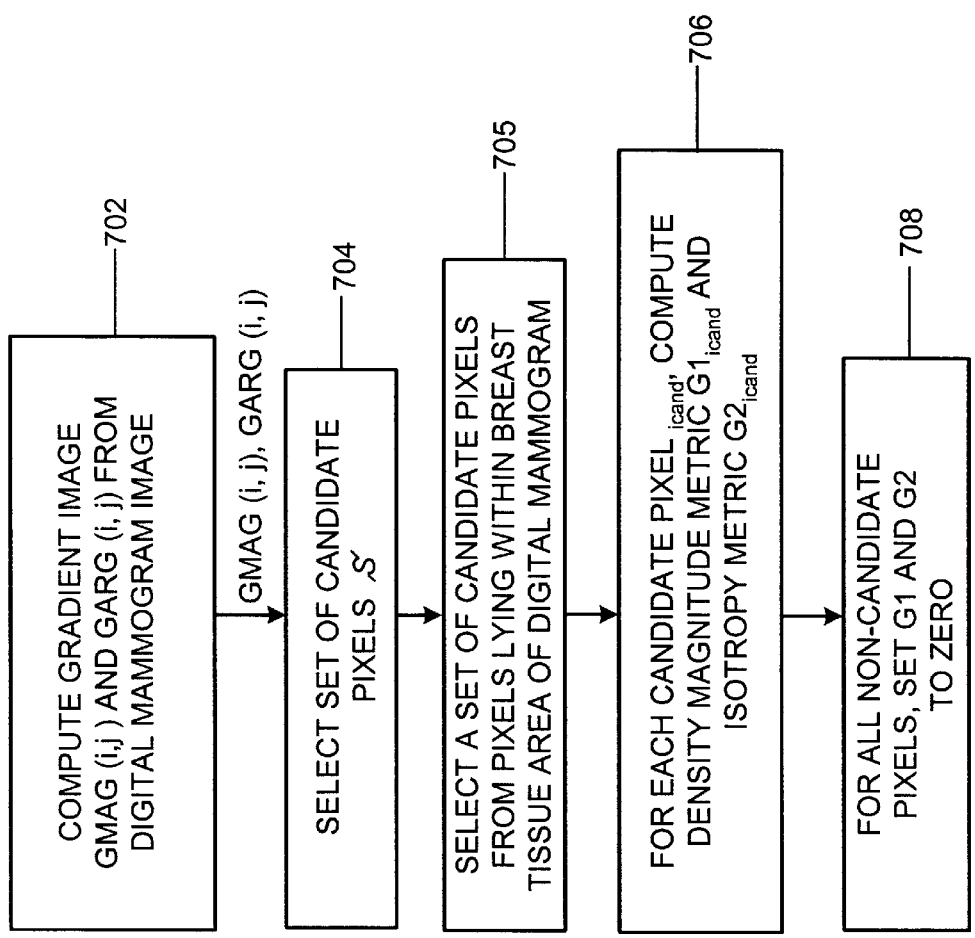
FIG. 7 is a flowchart representing overall steps taken in a mass detection algorithm according to a preferred embodiment.

FIG. 7 shows the steps taken by a mass detection algorithm in accordance with a preferred embodiment. It is to be appreciated that this algorithm is similar to that disclosed in Brake and Karssemeijer, "Detection of Stellate Breast Abnormalities," *Digital Mammography '96: Proceedings of the 3rd Int'l Workshop on Digital Mammography*, Chicago, USA (Jun. 9–12 1996), pp. 341–46, the contents of which are hereby incorporated by reference into the present application.

At step 702, the gradient image GMAG(i,j) and GARG(i,j) are computed from the digital mammogram image. The gradient orientations are computed on a larger spatial scale than the line direction measures at step 302, which is more appropriate for masses. Pixels that are inside a mass will be surrounded by pixels whose gradient directions point away from the central pixel; where 180 degrees is added to each gradient directions GARG(i,j), these pixels point toward the central pixel. However, if no structure is present, a more or less random direction is found.

At step 702, the digital mammogram image is convolved with two first derivatives of a Gaussian to produce $I_x$ and $I_y$, the gradients in the x and y directions. This space-scale approach gives a rotation invariant gradient estimation that can be computed easily on a number of scales. A Gaussian (see Eq. (1)) with a predetermined scale (σ=3 mm) is suitable for this purpose. In a preferred embodiment, it has been found that smaller scales (smaller values of σ) are better for detection of smaller masses, while larger scales (larger values of σ) are better for detection of larger masses. For example, as will be discussed infra, two separate passes using a first value of σ=3 mm and a second value of σ=0.2 mm has been found to be useful.

The gradient direction and magnitude are found according to the following equations.

$$GARG(i, j) = \tan^{-1}\left(\frac{I_y}{I_x}\right) \quad (9)$$

FIG. 7 then shows steps 704–708 which are highly analogous to the steps 304–308 in accordance with a preferred embodiment. The primary difference is that instead of the values LMAG(i,j) and LARG(i,j) which are supplied to step 304, the values GMAG(i,j) and GARG(i,j) are supplied to step 704. The mass metrics computed, $G1_{icand}$ and $G2_{icand}$, are analogous to the measures $F1_{icand}$ and $F2_{icand}$, in that they are computed in an almost identical fashion, except for the substitution of arguments discussed above. However, $G1_{icand}$ is termed a density magnitude measure, while $G2_{icand}$ is termed a density isotropy measure in accordance with a preferred embodiment, as these measures now correspond to mass characteristics.

A further difference is to be appreciated between the value of GARG(i,j) computed at step 702 in relation to LARG(i,j) computed in step 302. In particular, the value of line orientation LARG(i,j) is limited to the range $[0,\pi]$ as computed at step 302, whereas the gradient orientation GARG(i,j) lies in the interval $[0,2\pi]$. Thus, whereas Eq. (6) contains a scaling factor of 2 before the summation sign, the equivalent equation (Eq. (13) infra) will contain a scaling factor of 1.

As shown in FIG. 7, at step 704 a set of edge pixels S in the gradient image is chosen. More specifically, those points lying along edges will correspond to the set of gradient image pixels having GMAG(i,j) greater than a predetermined lower threshold. These pixels are selected as the set S of edge pixels.

At step 705, a set of candidate pixels is selected in a manner analogous to the manner of step 305. In particular, the selection of the candidate pixels may be performed by (1) identifying the breast tissue area of the digital mammogram and then (2) selecting pixels within that area as candidate pixels. Likewise, at step 705 the breast tissue area is to be sampled at regular sampling intervals to provide the set of candidate pixels.

At step 706, two density metrics are computed for each candidate pixel. As before, the candidate pixels will be referenced by a linear index icand, it being understood that each candidate pixel actually has a coordinate $(i_{icand}, j_{icand})$ in the gradient image. In particular, a density magnitude metric $G1_{icand}$ and an isotropy metric $G2_{icand}$ are computed, as will be describe further infra. At step 708, the density magnitude metrics G1 and isotropy metrics G2 are set to zero for all non-candidate pixels. The density magnitude metric $G1_{icand}$ and isotropy metric $G2_{icand}$ generated in the algorithm of FIG. 7 are then provided to the classification step 206 of FIG. 2 for determination of suspicious portions of the digital mammogram, using methods generally known in the art.

Figure 8:
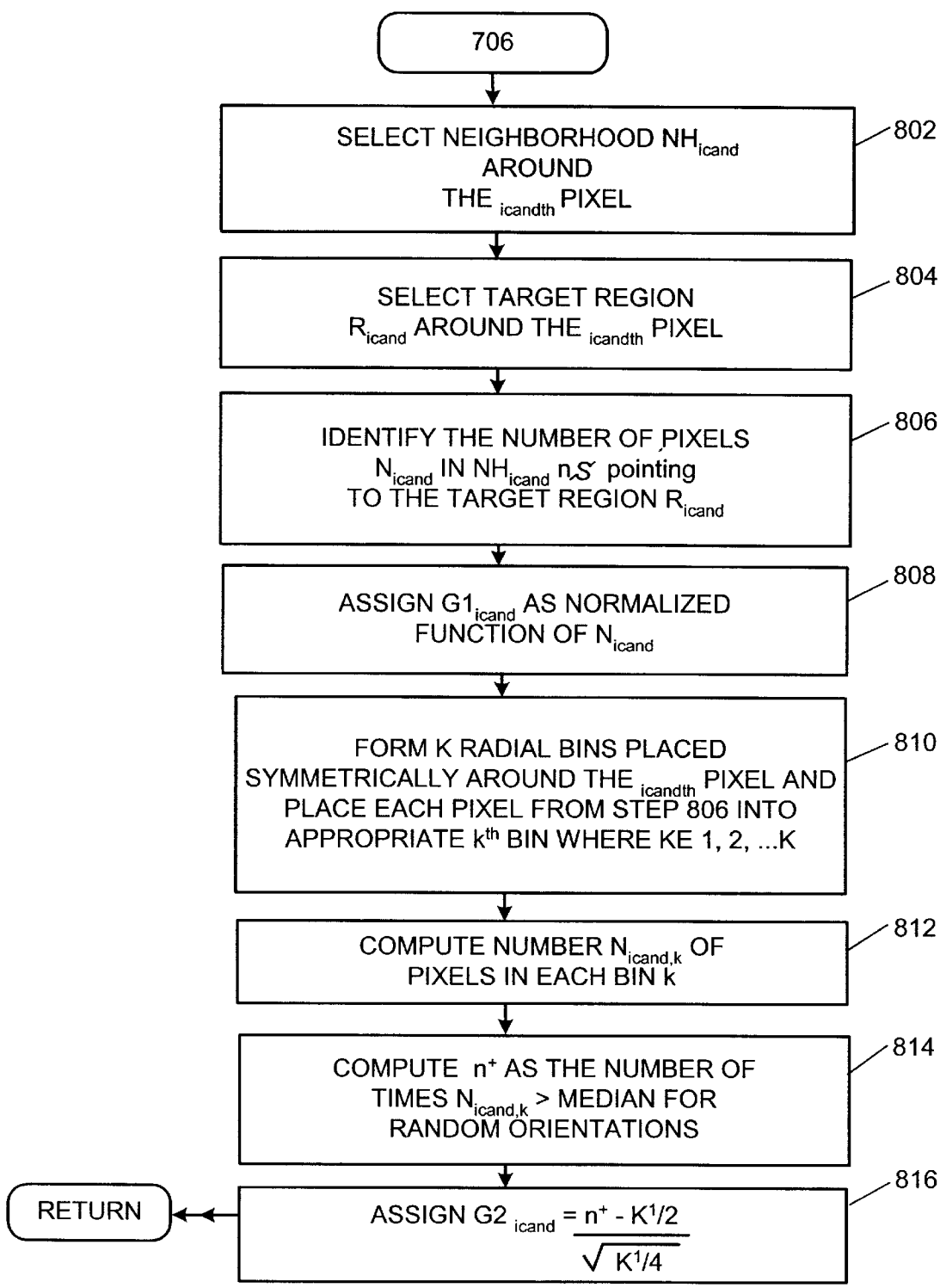
FIG. 8 is a flowchart representing steps taken by a mass detection algorithm as applied to a gradient image in accordance with a preferred embodiment.

FIG. 8 shows a block diagram outlining step 706 of FIG. 7 for computing the density magnitude metric $G1_{icand}$ and isotropy metric $G2_{icand}$ for each candidate pixel. At step 802, a neighborhood of pixels $NH_{icand}$ around the icand$^{th}$ candidate pixel is selected. Although the scope of the preferred embodiment is not so limited, the neighborhood $NH_{icand}$ is generally chosen as an annulus around the icand$^{th}$ candidate pixel, the annulus having an inner radius $r_{min}$ and an outer radius $r_{max}$.

Figure 9:
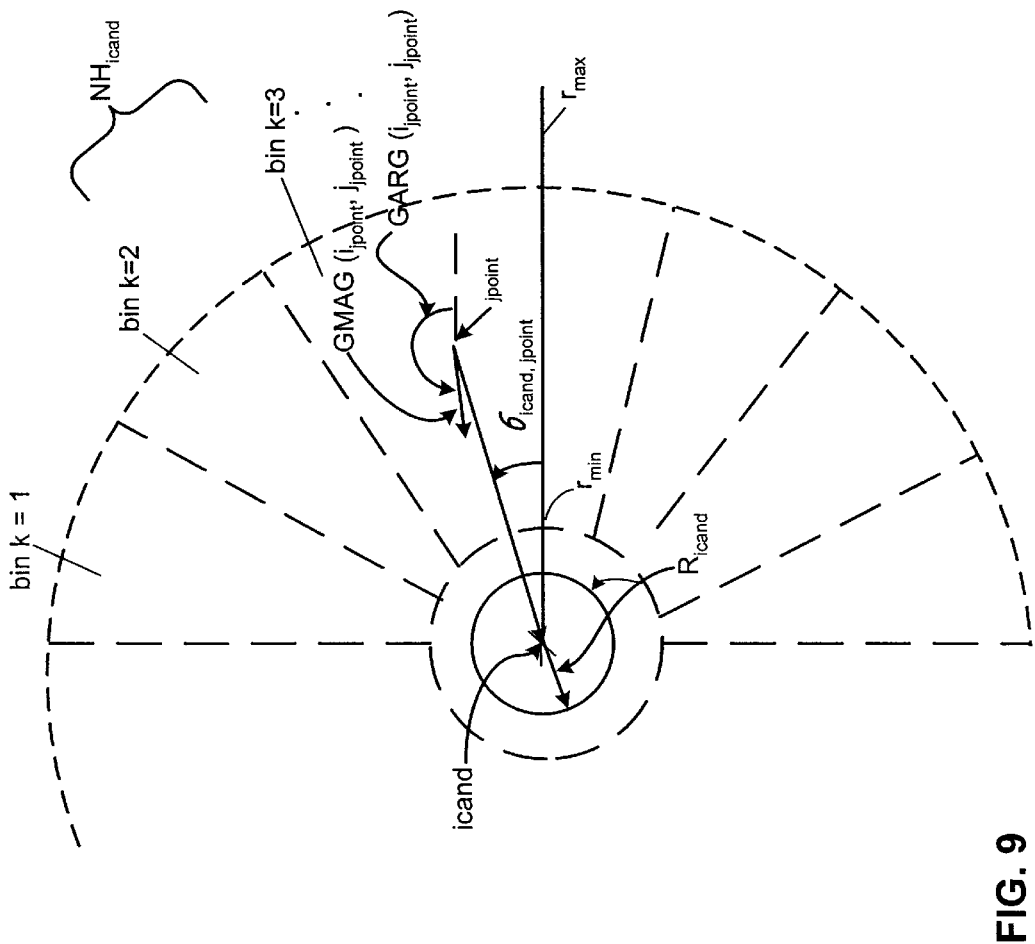
FIG. 9 is a diagram of a neighborhood pixel in relation to a candidate pixel showing parameters used in a mass detection algorithm in accordance with a preferred embodiment.

FIG. 9 shows a conceptual diagram of the icand$^{th}$ candidate pixel and its surrounding neighborhood $NH_{icand}$. At step 804, a small target region $R_{icand}$, having a radius of the same designation, is identified around the candidate pixel. The target region $R_{icand}$ is also shown in FIG. 9. At step 806, a subset of pixels lying in the neighborhood $NH_{icand}$ is selected, this subset having the property that (a) each pixel is in the set S of pixels having GMAG(i,j) greater than the predetermined lower threshold, and (b) a vector centered at that pixel has a gradient direction GARG(i,j) pointing toward the target region $R_{icand}$.

Generally, those candidate pixels icand having a larger number of surrounding pixels with gradient directions pointing toward the candidate pixel icand are more likely to be at the center of larger masses. Accordingly, a density magnitude measure would be proportional to the number of pixels surrounding the icand$^{th}$ pixel having such characteristics. Denoting the length of a line between icand and a qualifying pixel, denoted jpoint, as $r_{icand,jpoint}$, and denoting the angle formed by this line as $\phi_{icand,jpoint}$, this number $n_{icand}$ is computed in step 806 as expressed in the following equations.

$$n_{icand} = \sum_{jpoint \in NH_{icand} \cap S} h(GARG(i_{jpoint}, j_{jpoint}), \varphi_{icand,jpoint}, r_{icand,jpoint}) \quad (11)$$

$$h = 1 \text{ if } abs(\varphi_{icand,jpoint} - GARG(i_{jpoint}, j_{jpoint})) < \frac{R_{icand}}{r_{icand,jpoint}} \quad (12)$$

$$\text{else } h = 0$$

For more optimal use in subsequent classifier steps, the density magnitude measure $G1_{icand}$ is based on a normalized version of $n_{icand}$. In order to normalize $n_{icand}$, its mean value and variance are estimated under the assumption that the line direction orientation map is a uniformly distributed random noise pattern. A mean probability p that a pixel in this random map points to the target region $R_{icand}$ is shown in the following equation.

$$p = \frac{1}{\pi N_{icand}} \sum_{jpoint \in NH_{icand} \cap S} \left(\frac{R}{r_{icand,jpoint}}\right) \quad (13)$$

In Eq. (13), $N_{icand}$ is the total number of pixels in the neighborhood $NH_{icand}$. The density magnitude metric $G1_{icand}$ is then computed at step 808 according to the following equation.

$$G1_{icand} = \frac{n_{icand} - pN_{icand}}{\sqrt{N_{icand} p(1-p)}} \quad (14)$$

Because of this normalization the sensitivity of the density magnitude metric $G1_{icand}$ and its range do not change systematically when the neighborhood or target size $R_{icand}$ are changed. This enables changing these parameters adaptively and avoids problems at the breast edge.

If an increase in the number of pixels oriented toward the center is found in only a few directions, that is, if the distribution of these points is less circular around the icand$^{th}$ pixel, it is less likely that the site being evaluated belongs to a suspicious mass. On the other hand, if this distribution is more isotropic around the icand$^{th}$ pixel, the level of suspicion should increase. Accordingly, a second measure termed the isotropy metric $G2_{icand}$ is constructed.

To construct $G2_{icand}$, K radial direction bins are formed within the neighborhood $NH_{icand}$, and are placed around the icand$^{th}$ pixel in a radially symmetric fashion, as shown in FIG. 9. At step 810, each pixel identified at step 806, that is, each pixel in $NH_{icand}$ which have $GMAG(i_{jpoint}, j_{jpoint})$ greater than a predetermined lower threshold and which point toward the region $R_{icand}$, is placed into the appropriate $k^{th}$ direction bin, where $k = 1, 2, \ldots, K$. At step 812, the number of pixels $n_{icand,k}$ in each bin are computed.

At step 814, a number $n^+$ is computed as follows. In each radial direction bin k, the mean probability of finding $n_{icand,k}$ pixels oriented toward $R_{icand}$ is calculated by applying Eq. (14) to each bin separately. Using binomial statistics, the number $n^+$ is computed as the number of times that $n_{icand,k}$ is larger than the median value calculated for random orientations as k varies from 1 to K.

Finally, at step 816, the isotropy measure $G2_{icand}$ is defined by the following equation.

$$G2_{icand} = \frac{n^+ - K'/2}{\sqrt{K'/4}} \quad (15)$$

In equation (15), $K'/2$ is the expected value of $n^+$ when no signal is present. To avoid boundary effects, only bins with a minimum number of contributing sites is considered. Therefore, near the breast edge the actual number of bins K that are formed is to be reduced. The standard deviation of random fluctuations in the denominator of Eq. (15) normalizes the expression.

Once the values $G1_{icand}$ and $G2_{icand}$ are computed for each candidate pixel icand, the step 708 may be carried out, at which all values G1 and G2 for non-candidate pixels are set to zero. At this point, there is sufficient information to form two mass metric planes G1(i,j) and G2(i,j) for processing in linear classifier/neural network step 206 of FIG. 2. Importantly, at step 206 the density magnitude measure G1(i,j) and isotropy measure G2(i,j), which increase as the likelihood of a suspicious spiculation increases, may be used in conjunction with other mass and spiculation metrics in making a final determination of the suspicious locations in the digital mammogram image.

Advantageously, in a CAD system according to a preferred embodiment, the steps 704–708 of the mass detection algorithm of FIG. 7 are highly similar to the steps 304–308 of the spiculation detection algorithm of FIG. 3, with the exception that GMAG(i,j) is used instead of LMAG(i,j) or $W_{94}$(i,j), and with the exception that GARG(i,j) is used instead of LARG(i,j). Thus, according to a preferred embodiment, a gradient plane is computed from the digital mammogram and information in this gradient plane is processed for identifying masses in the digital mammogram. Further, the processing of information in the gradient plane comprises the step of applying a portion of a spiculation detection algorithm to the gradient plane. In this manner a computer program which has already been written may, with minor modifications (see, e.g., equation (13) in contrast to equation (6)), be ported into mass detection algorithms.

By way of example and not by way of limitation, typical values for $r_{min}$, $r_{max}$, $R_{icand}$, and K may be 4 mm, 16 mm, 2 mm, and 16, respectively. As discussed supra, it has been found that the use of smaller scales (smaller values of σ, such as a σ=0.2 mm) during the step 702 of computing the gradient magnitude GMAG(i,j) and gradient direction GARG(i,j) are better for detection of smaller masses. Larger scales (larger values of σ, such as σ=3 mm) have been found to be better for detection of larger masses. Additionally, it has been found that smaller values of $R_{icand}$ during the step 706 are better for detection of smaller masses, while larger values are better for detection of larger masses. For example, the value of $R_{icand}$ =2 mm may be useful for detection of smaller masses, whereas $R_{icand}$ =4 mm may be useful for detection of larger masses.

Accordingly, it has been found to be advantageous to use a multiscale approach for the detection of suspicious masses in digital mammograms. In this approach, the density magnitude metric G1(i,j) and density isotropy metric G2(i,j) are computed more than once using different parameter values for σ and $R_{icand}$, and the results are transmitted along with other information to a subsequent linear classifier/neural network step for an overall determination of suspiciousness.

Figure 10:
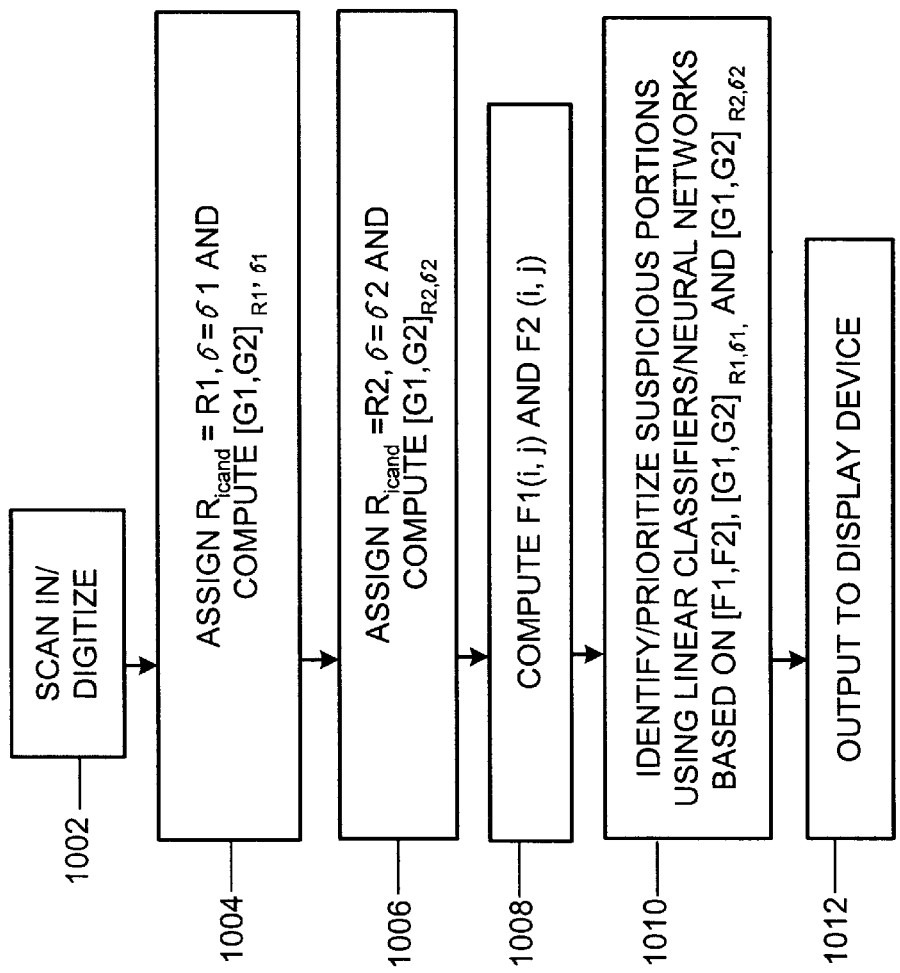
FIG. 10 is a flowchart representing overall steps taken by the CAD system of FIG. 1B in accordance with another preferred embodiment.

FIG. 10 shows steps carried out by a CAD system in accordance with another preferred embodiment, in which a multiscale approach for the detection of suspicious masses is used. After a step 1002 (similar to the step 202 of FIG. 2) is executed, a step 1004 is carried out in which the parameters $R_{icand}$ and σ are set to R1 and σ1, respectively. The density magnitude metric G1(i,j) and density isotropy metric G2(i,j) are then computed in a manner similar to steps 702–708 of FIG. 7, these metrics being identified by the simpler notation $[G1,G2]_{R1,\sigma 1}$.

Following this step, at step 1006 values for σ and $R_{icand}$ are reassigned to the values R2 and σ2, respectively, and the metrics $[G1,G2]_{R2,\sigma 2}$ are computed using steps similar to steps 702–708 of FIG. 7. Following this step, at step 1008 the spiculation magnitude metrics F1(i,j) and F2(i,j) are computed using steps similar to steps 302–308 of FIG. 3, these metrics being identified by the simpler notation [F1, F2].

At step 1010 the features $[G1,G2]_{R1,\sigma 1}$, $[G1,G2]_{R2,\sigma 2}$, and [F1,F2] are processed by linear classifier and/or neural network methods in determining suspicious masses in the digital mammogram. Accordingly, both smaller and larger masses are more reliably identified because of the different values of the pairs R1,σ1 and R2,σ2 used in the G1 and G2 calculations.

By way of example and not by way of limitation, the values of R1 and σ1 as used in step 1004 may be R1=2 mm and σ1=0.2 mm for sensitivity to smaller masses. The values of R2 and σ2, in turn, may be R2=4 mm and σ2=3 mm. Other values may be used in accordance with the preferred embodiment for optimization based on a variety of factors such as system hardware, statistical patient characteristics, and other factors.

Finally, at step 1012, suspicious portions of the digital mammogram are identified to the user by means of a display device. Advantageously, specificity and sensitivity are increased in the method of FIG. 10 by the use of the "spiculatedness" or "stellateness" measures F1 and F2 in conjunction with the mass feature metrics G1 and G2 computed at different scales.

In another preferred embodiment, a variation of the steps 1004 and 1006 of FIG. 10 may be used, wherein the value of $r_{max}$ is varied instead of $R_{icand}$. Indeed, it has been found that a mass detection algorithm according to a preferred embodiment is more sensitive to variations in $r_{max}$ than to variations in $R_{icand}$ for purposes of sensitivity to different sized masses. For larger values of $r_{max}$, pixels at the edges of larger masses are more likely to be "captured" within the annulus of FIG. 9, and thus are more likely to count toward the values $G1_{icand}$ and $G2_{icand}$, than when smaller values of $r_{max}$ are used. However, larger values of $r_{max}$ cause reduced sensitivity to smaller masses, because an unnecessarily large number of non-edge pixels surrounding smaller masses are "captured" within the annulus of FIG. 9. This results in higher "noise" values in the neighborhood around the center pixel, causing reduced sensitivity to smaller masses.

Accordingly, it is advantageous to first compute the density magnitude metric G1(i,j) and density isotropy metric G2(i,j) for a first pair of parameter values $r_{max1}$ and σ1, and then to compute G1(i,j) and G2(i,j) for a second pair of parameter values $r_{max2}$ and σ2. The features $[G1,G2]_{rmax1,\sigma 1}$, $[G1,G2]_{rmax,\sigma 2}$, and [F1,F2] are then processed by a linear classifier and/or neural network methods in determining suspicious masses in the digital mammogram.

By way of example and not by way of limitation, typical values for $r_{max1}$ and σ1 may be 10 mm and 0.2 mm, respectively. Typical values for $r_{max1}$ and σ2 may be 16 mm and 3 mm, respectively. Importantly, as with other parameters such as $r_{min}$ and K noted above, more optimal values for $r_{max}$ and σ may be determined by a person skilled in the art for greater sensitivity and specificity, depending on a variety of factors such as system hardware, statistical patient characteristics, and other factors.

While the adaptation of a portion of a spiculation detection engine for use in a mass detection algorithm has been disclosed in terms of the Karssemeijer metrics F1→G1 and F2→G2, other spiculation detection algorithms are easily adaptable for use in mass detection algorithms in accordance with a preferred embodiment. As an example, in U.S. patent application Ser. No. 08/676,660, assigned to the assignee of the present invention, a spiculation detection algorithm for generating a cumulative array C(i,j) was adapted for generating a mass detection measure Sphericity(i,j), which is related to presence of circumscribed masses centered at (i,j). As shown in that disclosure, the described forward transform method applied to the line image for detecting spiculations was advantageously adapted to be applied to the gradient image for detecting masses.

While preferred embodiments of the invention have been described, these descriptions are merely illustrative and are not intended to limit the present invention. For example, although the embodiments of the invention described above were in the context of a system for computer aided diagnosis and detection of breast carcinoma in x-ray films, those skilled in the art will recognize that the disclosed methods and structures are readily adaptable for broader applications. For example, the invention is applicable to many other types of CAD systems for detection of other types of medical abnormalities. Thus, the specific embodiments described here and above are given by way of example only and the invention is limited only by the terms of the appended claims.

What is claimed is:

1. A method of detecting masses in a digital mammogram, comprising the steps of:

computing a gradient plane from said digital mammogram;

processing information in said gradient plane for identifying masses in said digital mammogram by applying a portion of a spiculation detection algorithm to said gradient plane, wherein said spiculation detection algorithm comprises:

a line detection step for generating line information and direction information corresponding to the digital mammogram; and a post-line detection step for identifying spiculations in the digital mammogram using said line information and said direction information;

wherein the portion of said spiculation algorithm which is applied to said gradient plane is said post-line detection step.

2. The method of claim 1, said gradient plane comprising gradient magnitude information and gradient direction information, wherein:

when said post-line detection step of said spiculation detection algorithm is used in said spiculation detection algorithm, said post-line detection step receives a first input equal to said line information from said line detection step of said spiculation detection algorithm, said post-line detection step of the spiculation detection algorithm also receiving a second input, said second input being equal to said direction information from said line detection step of said spiculation detection algorithm;

and wherein when said post-line detection step of said spiculation detection algorithm is applied to said gradient plane, said gradient magnitude information is received as said first input and said gradient direction information is received as said second input.

3. The method of claim 2, wherein:

when said post-line detection step of said spiculation detection algorithm is used in said spiculation detection algorithm, said post-line detection step generates a first output corresponding to spiculation location information;

and wherein when said post-line detection step of said spiculation detection algorithm is applied to said gradient plane, said first output corresponds to mass location information.

4. The method of claim 3, wherein:

when said post-line detection step of said spiculation detection algorithm is used in said spiculation detection algorithm, said post-line detection step generates a second output corresponding to spiculation intensity information;

and wherein when said post-line detection step of said spiculation detection algorithm is applied to said gradient plane, said first output corresponds to mass intensity information.

5. The method of claim 4, said digital mammogram comprising pixels, said line information and said direction information formed in a line image plane comprising pixels, wherein said post-line detection step of said spiculation detection algorithm comprises the steps of:

receiving said line image plane;

selecting a set of candidate pixels in said digital mammogram;

for each candidate pixel:

selecting a neighborhood of pixels near said candidate pixel;

selecting a small region around said candidate pixel;

computing a first spiculation metric proportional to the number of pixels in said neighborhood which are located along lines in said line image plane and which have direction information pointing toward said small region; and evaluating said first spiculation metrics of said candidate pixels for determining the locations of spiculations in said digital mammogram.

6. The method of claim 5, said post-line detection step of said spiculation detection algorithm further comprising the steps of:

for each candidate pixel:

computing a second spiculation metric corresponding to the spatial distribution of those pixels in said neighborhood which are located along lines in said line image plane and which have direction information pointing toward said small region, said second spiculation metric increasing according to the isotropy of said spatial distribution around said candidate pixel; and evaluating said first and second spiculation metrics of said candidate pixels for determining the locations of spiculations in said digital mammogram.

7. The method of claim 6, wherein said set of candidate pixels comprises each pixel in said line image.

8. A method of detecting masses in a digital mammogram, comprising the steps of:

computing a gradient plane from said digital mammogram, said gradient plane comprising pixels, each pixel having gradient magnitude and gradient direction information;

selecting a set of candidate pixels in digital mammogram image;

for each candidate pixel, computing a first density metric based on a first set of surrounding pixels having gradient magnitudes above a first threshold and having gradient directions pointing generally toward said candidate pixel; and evaluating said first density metrics for determining the locations of masses in said digital mammogram.

9. The method of claim 8, further comprising the steps of:

for each candidate pixel, computing a second density metric corresponding to a spatial distribution of said first set of pixels, said second density metric corresponding to the isotropy of said spatial distribution around said candidate pixel; and evaluating said first and second density metrics of said candidate pixels for determining the locations of masses in said digital mammogram.

10. The method of claim 9, said candidate pixels being identified according to an index icand, said first density metric for the $icand^{th}$ candidate pixel being denoted $G1_{icand}$, said first density metric $G1_{icand}$ being computed according to the steps of:

selecting a neighborhood of pixels $NH_{icand}$ around said candidate pixel;

selecting a small region $R_{icand}$ around said candidate pixel;

selecting said first set of pixels from a set of pixels lying in said neighborhood $NH_{icand}$ having directions which point toward said small region $R_{icand}$; and counting the number of pixels in said first set;

wherein said first density metric $G1_{icand}$ is proportional to the number of pixels in said first subset.

11. The method of claim 10, said first set of pixels corresponding to the $icand^{th}$ candidate pixel being denoted by an index (icand,jpoint), said second density metric for the $icand^{th}$ candidate pixel being denoted $G2_{icand}$, said second density metric $G2_{icand}$ being computed according to the steps of:

selecting K spatial bins (icand,k) extending radially from said candidate pixel and being arranged in a radially symmetric manner around said candidate pixel;

for each pixel (icand,jpoint) of said first set of pixels, identifying the spatial bin (icand,k) in which said pixel (icand,jpoint) is located; and computing a number of pixels $n_{icand,k}$ in each spatial bin (icand,k);

wherein said second density metric $G2_{icand}$ is based on the statistical distribution of the number $n_{icand,k}$ as k is varied.

12. The method of claim 11, wherein $G2_{icand}$ is proportional to the number of values k for which $n_{icand,k}$ is greater than a median value calculated for random orientations.

13. The method of claim 10, wherein said neighborhood of pixels $NH_{icand}$ forms an annular region around said icand$^{th}$ candidate pixel.

14. The method of claim 13, wherein said small region $R_{icand}$ is a circular region lying within said annular region formed by said neighborhood of pixels neighborhood of pixels $NH_{icand}$.

15. The method of claim 9, wherein said step of evaluating said first and second density metrics is performed according to a linear classifier method.

16. The method of claim 9, wherein said step of evaluating said first and second density metrics is performed according to a neural network method.

17. The method of claim 8, wherein said set of candidate pixels comprises each pixel in said gradient plane.

18. A method of detecting masses in a digital mammogram, comprising the steps of:

computing a gradient plane from said digital mammogram, said gradient plane comprising pixels, each pixel having gradient magnitude and gradient direction information;

selecting a set of candidate pixels in said gradient plane, said candidate pixels being denoted by an index icand;

for each candidate pixel icand, computing a first density metric $G1_{icand}$ according to the steps of:

selecting a neighborhood of pixels $NH_{icand}$ around said candidate pixel;

selecting a small region $R_{icand}$ around said candidate pixel;

selecting a first set of pixels in said neighborhood $NH_{icand}$ having gradient directions pointing toward said small region $R_{icand}$ and having a gradient magnitude greater than a predetermined lower threshold, said first set of pixels being denoted by the counter variable jpoint; and counting the number of pixels in said first set, wherein said first density metric $G1_{icand}$ is proportional to the number of pixels in said first set;

for each candidate pixel icand, computing a second density metric $G2_{icand}$ according to the steps of:

selecting K spatial bins (icand,k) extending radially from said candidate pixel and being arranged in a radially symmetric manner around said candidate pixel;

for each pixel (icand,jpoint) of said first set of pixels, identifying the spatial bin (icand,k) in which said pixel (icand,jpoint) is located; and computing a number of pixels $n_{icand,k}$ in each spatial bin (icand,k), wherein said second density metric $G2_{icand}$ is based on the statistical distribution of the number $n_{icand,k}$ as k is varied; and evaluating said first and second density metrics $G1_{icand}$ and $G2_{icand}$ according to a linear classifier method for determining the locations of masses in said digital mammogram.

* * * * *